United States Patent [19]

Föhl

[11] Patent Number: 4,505,496
[45] Date of Patent: Mar. 19, 1985

[54] DRIVE DEVICE FOR MOVING THE END FITTING OF A PASSIVE SAFETY BELT

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 417,074

[22] Filed: Sep. 13, 1982

[30] Foreign Application Priority Data

Sep. 14, 1981 [DE] Fed. Rep. of Germany ....... 3136335

[51] Int. Cl.³ .............................................. B60R 21/10
[52] U.S. Cl. ....................................... 280/804; 74/422
[58] Field of Search ................... 280/802, 804; 74/422

[56] References Cited

U.S. PATENT DOCUMENTS

| 3,513,587 | 5/1970 | Fischer | 74/422 |
| 3,552,222 | 1/1971 | Eck | 74/422 |
| 3,807,523 | 4/1974 | Fiala et al. | 280/804 |
| 3,830,518 | 8/1974 | Silber | 280/804 |
| 4,402,160 | 9/1983 | Brusasco | 74/422 |

FOREIGN PATENT DOCUMENTS

| 1259650 | 1/1968 | Fed. Rep. of Germany | 74/422 |
| 2915053 | 10/1980 | Fed. Rep. of Germany | 280/804 |
| 787765 | 12/1957 | United Kingdom | 74/422 |

Primary Examiner—Joseph F. Peters, Jr.
Assistant Examiner—Ross Weaver
Attorney, Agent, or Firm—Yount & Tarolli

[57] ABSTRACT

Drive device for moving the end fitting of a passive safety belt along a predetermined motion track which has track sections extending at an angle to each other, by means of a flexible pulling and pushing means which can be driven by a drive and is coupled to the end fitting to be moved. The pulling and pushing means are guided with radial play relative to the pulling means axis in a guide extending along the motion track and have links which can move relative to each other and are arranged with axial spacing in a fixed relationship to each other.

16 Claims, 14 Drawing Figures

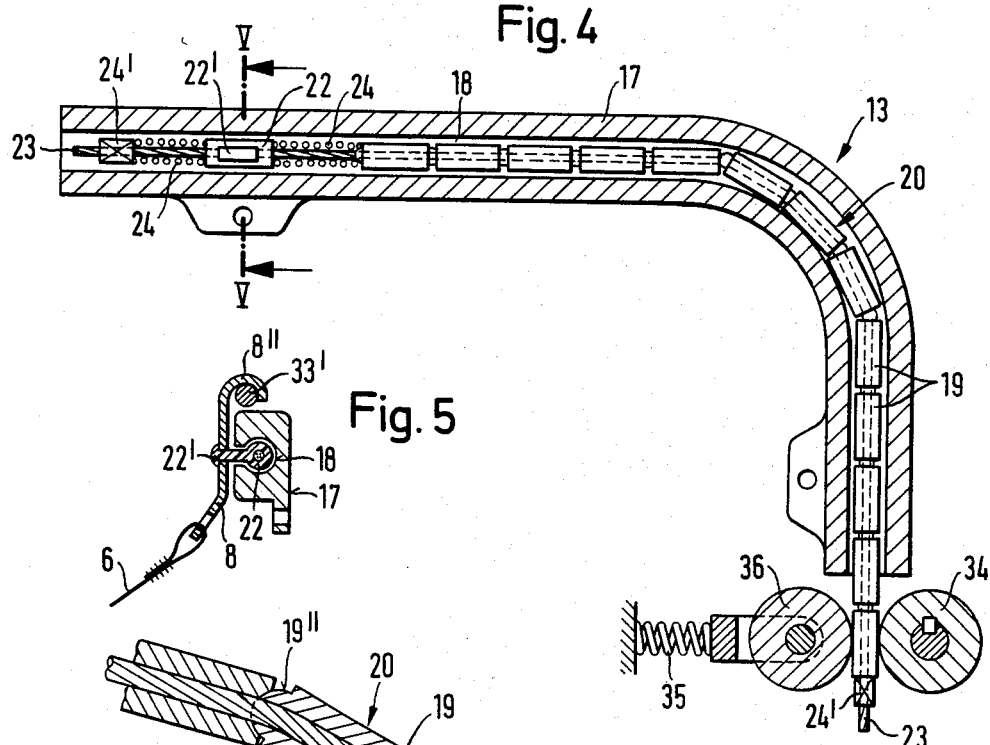
Fig. 4
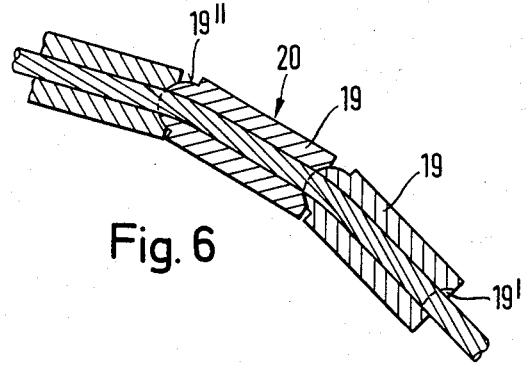
Fig. 5
Fig. 6
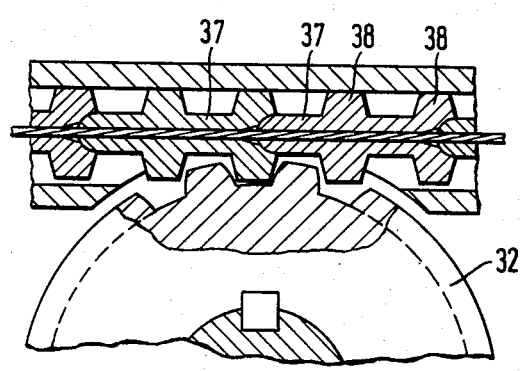
Fig. 7
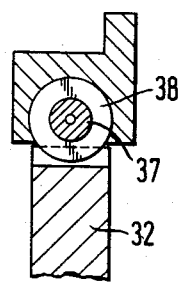
Fig. 8

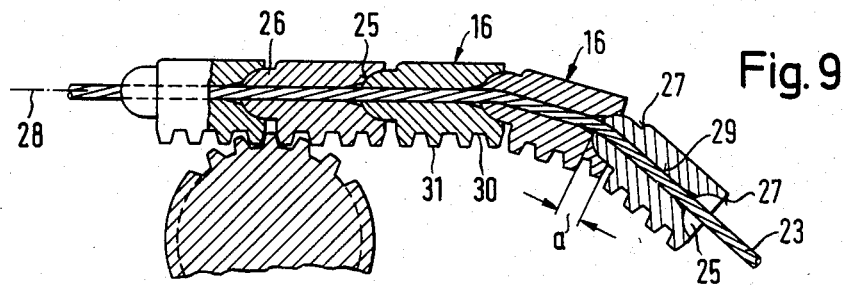
Fig. 9
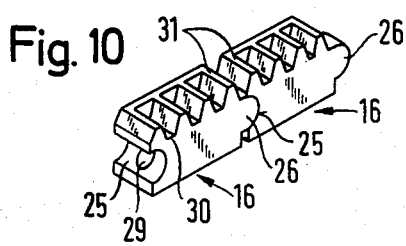
Fig. 10
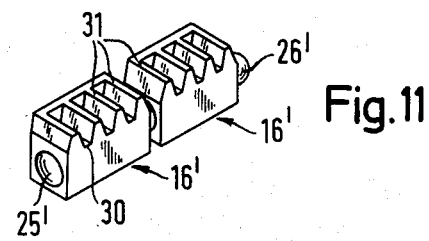
Fig. 11
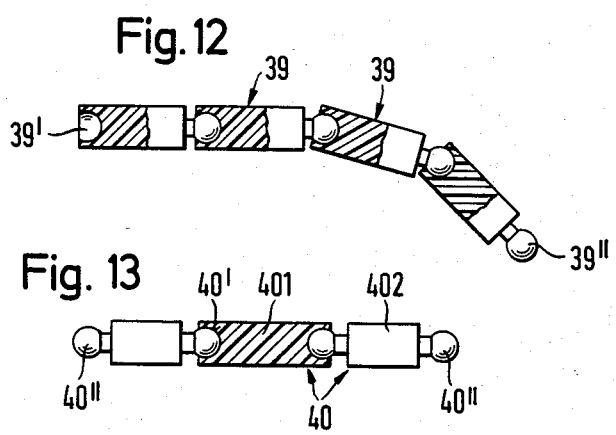
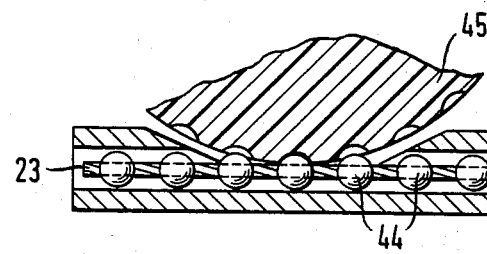
Fig. 12
Fig. 13
Fig. 14

DRIVE DEVICE FOR MOVING THE END FITTING OF A PASSIVE SAFETY BELT

BACKGROUND OF THE INVENTION

1. Field of the Invention

The invention relates to a drive device for moving the end fitting of a passive safety belt along a predetermined motion track which has track sections extending at an angle to each other, by means of a flexible pulling and pushing means which can be driven by a drive and is coupled to the end fitting to be moved.

2. Description of the Prior Art

Flexible drive devices are known, for instance in the form of a bowden cable in which the pulling means proper consists of a flexible steel or plastic cable which is formed in a tubular sleeve part and which is driven by hand or by a motor. Such a drive device can be installed in any desired manner, the flexibility of the pulling means determining the magnitude of the possible deflections or bends. When under tensile as well as compression stress, large sliding friction forces occur at the deflection points which set relatively narrow limits to the drive system, especially under the influence of heavy temperature variations. As already indicated, a substantial disadvantage of such drive systems is that, when the pulling means is moved in curves with a relatively small radius of curvature, very high friction forces occur which lead to increased wear at the pulling means as well as at the guide and require a large amount of driving power. In passive safety belt systems for motor vehicles it is known to make the end fitting parts of the belt movable in the motor vehicle along a guide in such a manner that, before the person to be protected boards the vehicle, this end fitting point is at first in the vicinity of the so-called A-post and, during or after the boarding, is moved along a guide track into the vicinity of the B-post. For this purpose, customarily, drive devices are used, for instance in the form of flexible flat plastic belts or in the form of plastic-jacketed steel cables. Here, too, the described disadvantages appear.

SUMMARY OF THE INVENTION

An object of the invention is to provide a drive device for moving the end fitting of a passive safety belt along a predetermined motion track such that large friction forces are avoided with certainty while the embodiment is of simple design, and at the same time providing freedom with regard to the course of the motion path.

With the foregoing and other objects in view, there is provided in accordance with the invention a drive device for moving an end fitting of a passive safety belt along a predetermined motion track which has track sections extending at an angle to each other comprising a flexible pulling and pushing means coupled to the end fitting to be moved, and a drive for driving the flexible pulling and pushing means, the combination therewith of a guide extending along the motion track in which the pulling and pushing means are guided with radial play relative to the pushing and pulling means axis, said pushing and pulling means in said guide having links which can move relative to one another and are arranged with axial spacing in a fixed relationship to one another.

Other features which are considered as characteristic for the invention are set forth in the appended claims.

Although the invention is illustrated and described herein as embodied in a drive device for moving the end fitting of a passive safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 4 is a sectional view of a drive device similar to that shown in FIG. 3;

FIG. 5 is a sectional view of the drive device taken along line V—V of FIG. 4;

FIG. 6 is a sectional view of a part of the pulling and pushing means in the embodiment according to FIG. 4;

FIGS. 7-13 show the presentations of differently designed pulling and pushing means according to the invention; and FIG. 14 shows a further embodiment of the drive device according to the invention in a sectional view.

DETAILED DESCRIPTION OF THE INVENTION

Figure 1:
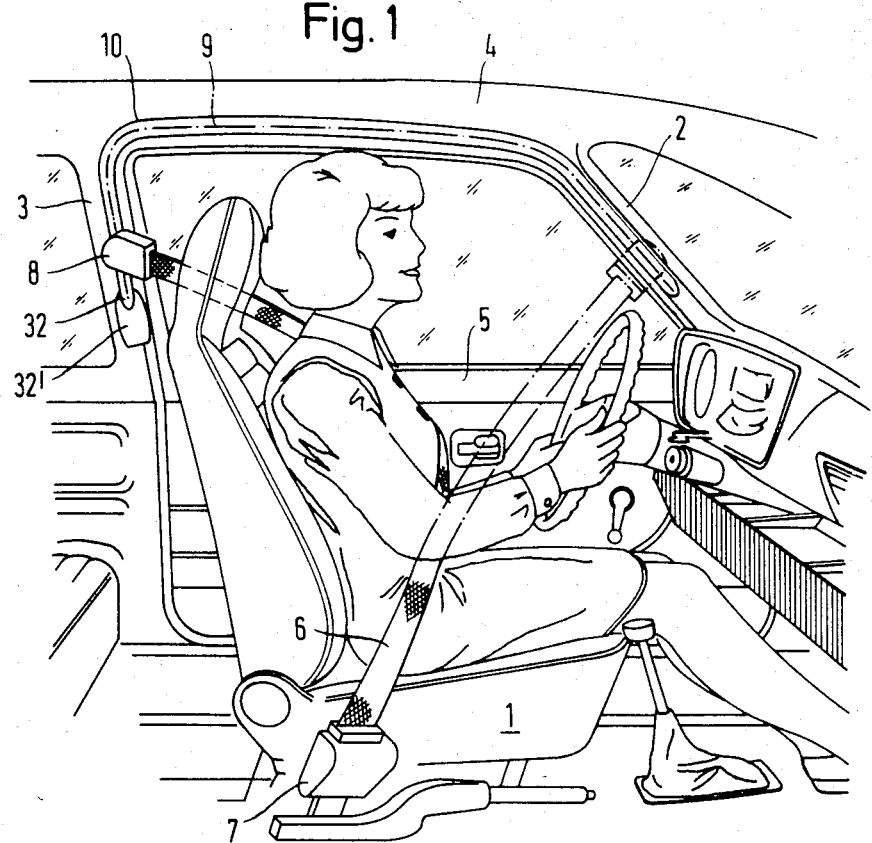
FIGS. 1 and 2 show perspective views of part of a passenger motor vehicle with a schematic presentation of a drive device for the end fitting of a safety belt according to the invention, FIG. 1 showing the activated position and FIG. 2 the non-activated position of the safety belt system.

According to the invention, the flexible pulling and pushing means of the drive device are guided with radial play relative to the pulling means axis in a guide extending along the motion track and have links which can move relative to each other and are arranged with axial spacing in a fixed relationship to each other. By virtue of the drive device according to the invention, the described disadvantages are avoided and in particular, the drive system runs freely and operates without significant wear at minus as well as at plus temperatures. The reason for this is that under tensile as well as compression stress, the pulling means no longer rest, as in the known devices, within curves in the motion path over a large area and tense against the guide surrounding the pulling means, or, in the case of compression stress, buckles out of the desired position, and again rests closely against the opposite side of the guide, causing in either case considerable friction. In the drive device according to the invention, especially in curved regions, a practically point or line-shaped contact, i.e. contact with a very small area takes place between the members of the pulling means and the guide. Consequently, large friction forces or friction resistances are avoided with certainty. In contrast to known devices, there is therefore no close contact of the pulling means with the guide. For this reason, the driving forces, for instance the power of an electric drive motor, can also be kept low. The pulling or pushing means according to the invention can be applied as a finite flexible cable or preferably as a flexible endless driving means. Such as pulling or pushing means can be connected in a designwise simple manner to an end fitting of a safety belt system and can be used for moving the latter.

In an embodiment of the invention, the pulling and pushing means have sleeve-like links lined up on a flexible cable. Both sides of the links have support elements each of which is braced against a support element of an adjacent link, preferably resiliently, in an articulated manner such that a space remains between the link end faces of adjoining links which extend beyond the support elements when negotiating curves.

The above arrangement of sleeve-like links with support elements on a flexible cable permits the use of a thin tension cable proper, since the stability during the drive process is obtained by the immediately adjoining members of the pulling or pushing means. Preferably, a dimensionally stable plastic material is used for the links. By arranging the support elements in line with the neutral or central fiber of the cable, the links are mutually centered and no tensions occur due to abutting adjacent links when curves are negotiated. By the resilient bracing of the links, care is taken for compensation of clearance and freedom of play of the system. The link which has an output post for fastening the end fitting for the safety belt is arranged at one pulling means end between two equalization springs and is braced against the other links. In this manner, far reaching compensation of tolerances is obtained and at the same a damping device for the above-mentioned end fitting or for the belt in the two extreme positions.

According to a further embodiment of the invention, links shaped, for instance like beads, are used as guiding elements and also as drive elements.

According to a further invention variant, the installation of a flexible cable into the pulling and pushing means becomes unnecessary, the links being connected to each other directly in an articulated manner and coupled to each other. The coupling elements are preferably designed in the form of snap-on locks, which simplifies the assembly substantially.

The drive pinion or the drive pulley may be detached from the pulling or pushing means, preferably so that it can be swung away. Thus, if the drive motor fails, the pulling and pushing means can be moved by hand. Further advantageous details of the invention may be seen from the embodiment examples shown in the drawing and described in the following.

FIG. 1 shows the interior of a passenger motor vehicle and specifically the area of the driver's seat 1, the A-post 2 of the vehicle body and the B-post 3, and a horizontal strut 4 which extends between posts 2 and 3. The driver's door on the vehicle side is designated by numeral 5. To protect the vehicle passenger, a passive safety belt system is provided with a flexible belt 6 which fits around the upper part of the body of the vehicle passenger and is fastened, for instance detachably, at opposite ends to the fitting parts 7 and 8. The fitting part 7 is, for instance, an automatic wind-up device for the belt 6 in which the belt is under the action of a wind-up spring. The other end of the belt 6 is connected indirectly via the end fitting to a flexible pulling and pushing means generally designated with 9, which is guided in a guide 10. The guide 10 which may be sleeve-like or tubular extends from the B-strut 3 upward along the horizontal strut 4 and from there, inclines slightly downward, to the A-strut 2. FIG. 1 shows the two extreme positions of the end fitting 8, and specifically, the dash-dotted position of the belt 6 shows the boarding or rest position of the safety system, while the uninterrupted lines of the belt show the system in the working or operating position. As is usual, the system, for instance the automatic wind-up device 7, contains a locking system which locks the belt 6 instantly in case of an extreme vehicle deceleration and prevents the vehicle passengers from falling forward.

Figure 2:
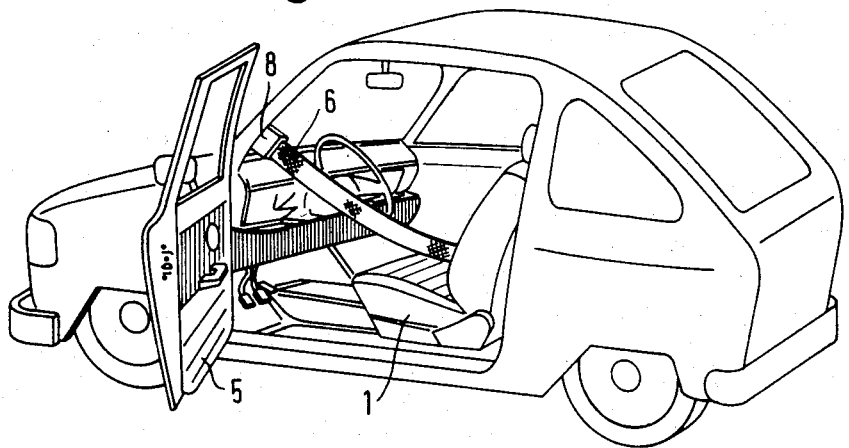

FIG. 2 shows the vehicle with door 5 open in the boarding position of the belt 6 with the end fitting 8.

Figure 3:
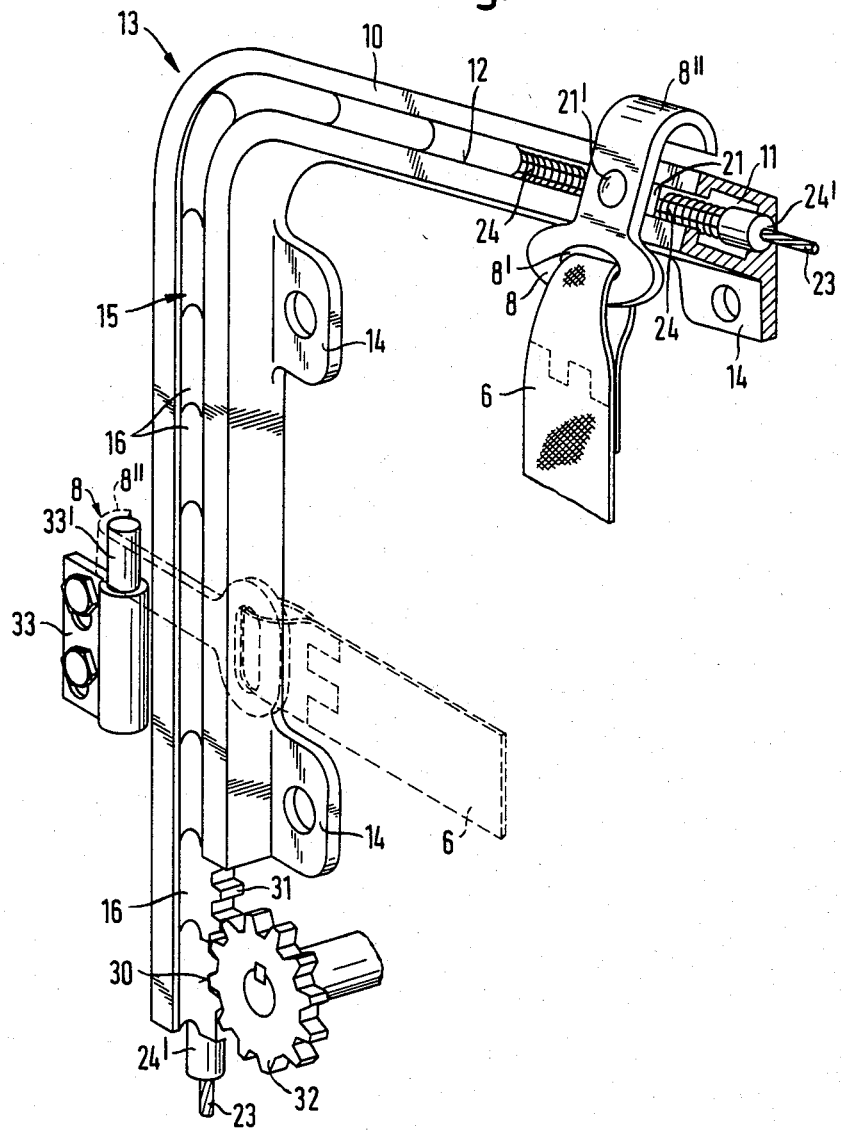
FIG. 3 is a perspective view of the drive device according to the invention in which are shown a guide having a region of curvature, pulling and pushing means having a flexible cable encircled by links, an end fitting, and a drive pinion for moving the pulling and pushing means.

In the embodiment example according to FIG. 3, part of a guide indicated in FIG. 1 which is designed in the form of a profile bar and has a largely closed guide canal 11 is again designated with 10. This guide canal 11 has a rectangular cross section. The guide 10 has a rectangular shape similar to the embodiment example according to FIGS. 4 and 5, and has fastening lugs 14 for fastening the guide 10 to the vehicle frame of the motor vehicle. In contrast to the embodiment example according to FIGS. 4 and 5, the guide canal 11 of FIG. 3 has a rectangular cross section. Again, in agreement with the embodiment example according to FIGS. 4 and 5, a longitudinal slot 12 goes through the entire guide 10 and opens into the guide canal 11. Guided in the guide canal 11 is a pulling and pushing means 15 which will be described in detail further on and which consists of a multiplicity of lined-up links 16 of stable material, for instance of plastic. In the embodiment example according to FIGS. 4 and 5, the guide 17 has a guide canal 18 with a circular cross section in which pulling and pushing means 20 consisting of links 19 with a circular cross section is guided. In both embodiment examples, the pulling and pushing means 15 and 20, respectively, i.e. its links 16 and 19, respectively, is guided with radial play in the guide canal 11 and 18, respectively. Likewise in far-reaching agreement between the above-mentioned embodiment examples according to FIG. 3 and FIGS. 4 and 5, one of the links, and specifically the link designated 21 and 22, respectively, has a radially projecting output post 21' and 22', respectively, to which an end fitting 8 for a belt 6, sewed into an opening 8', is fastened, for instance, by riveting the output post consisting of plastic. The end fittin 8 has an extension 8" which is bent in hook-fashion. In both embodiment examples, the links 16 and 19, respectively, are lined-up in the manner of a chain on a flexible cable 23, for instance a steel or plastic cable. In the embodiment examples, the links 16 and 19 which are braced against each other in an articulated manner, are held together with pretension by equalizing springs 24 which are pushed onto the cable 23 on both sides of the corresponding link 21 and 22 and are braced together by pressed sleeves 24', whereby the lined-up links are braced together. The pressed sleeves 24' are clamped or pressed here together with the cable 23. In the embodiment example according to FIG. 3, the links 16 have rectangular cross section corresponding to FIGS. 9 and 10. It may be seen from the last-mentioned figures, that each link 16 has on the one side a ball socket 25 and on the other side, a ball head 26, which represent bearing elements for the mutually articulated bearing. These bearing elements are set back relative to the outer link end faces, for instance face 27, and are located in line with neutral fiber 28 of the cable 23. The links 16 have a sleeve-like shape and have through holes 29 which are conically expanded at the opposite ends. The link end faces 27 are set back relative to the post-like convex ball heads 26 by a dimension a such that between the link end faces 27 of immediately adjacent links 16 enough spacing remains so that the link end faces 27 of these adjacent links do not touch each other. Also, because of the compensation springs 21 according to FIGS. 3, 4 and 5, the individual links are braced against each other resiliently. The main difference of the embodiment example according to FIG. 11 and that of FIGS. 9 and 10 resides in the former not having ball socket-like and ball head-like elongated recesses in the joints as bearing elements but the joints 16' according to FIG. 11 are equipped with ball cups 25' with circular cross section and circular ball heads 26'.

In the embodiment examples according to FIGS. 3, 9 and 10, and 11, the links 16 and 16' have tooth-like cuts 30 in the manner of a rack. Teeth 31 formed thereby positively engage the teeth of a drive pinion 32 which can preferably be detached, i.e. swung away from the pulling and pushing means 15 and is supported, for instance, on a rocking lever or the like. The drive pinion 32 is in connection with an electric drive motor 32', FIG. 1, not shown in detail, which can be switched off for instance by electric end switches arranged in the end positions of the end fitting 8. In FIG. 3, one of these end positions of the end fitting 8 is illustrated by dashed lines, namely, in the working or operating position in which the end fitting 8 is found to be after the belt 6 is put in place. In this position of the end fitting gate, an armature extension 33 fixed at the housing is fastened to the B-post 3 (FIG. 1), which has an armature projection 33' into which the hook-like extension 8" is hooked in the above-mentioned position and therefore can withstance extreme pulling forces.

As already mentioned, the embodiment example according to FIGS. 4, 5 and 6 differ from the embodiment example according to FIGS. 3, 9, 10 and 11 in that the links 19 and 22 of the pulling and pushing means 20 have circular cross sections as is shown particularly clearly in FIG. 5. Here also, ball cups 19' and ball heads 19" are formed at both ends of the individual links 19 similar to FIG. 11. The pushing and pulling means 20 can be driven in the pushing or pulling direction by a motor driven drive pulley 34 with a substantially smooth surface which is arranged opposite a counter pulley 36 which is under spring tension 35. As shown in FIG. 4, the links 19 and 22, respectively, of the pulling and pushing means 20 touch the boundary walls of the guide canal 18 only partially in the region of the curvature 13, i.e. in point or line-fashion but not over the arc, so that only small friction losses are produced. The pulling and pushing means 20 according to FIG. 4 is in frictional connection with the drive 34. The immediately adjacent links 19 are spaced that no contact of the link end faces takes place when the curvature 13 is negotiated.

In the embodiment example according to FIGS. 7 and 8, the links 37 of circular cross section have ring-shaped engagement elements 38 which, according to the embodiment example as per FIG. 3, are or can be coupled with the teeth of the drive pinion 32.

In FIGS. 12 and 13, embodiments of pulling and pushing means are illustrated which deviate from the pulling and pushing means according to preceding figures. While in the preceding embodiment examples, a number of links provided with through holes are loosely lined up on a cable 23 and are braced resiliently, there is no such cable in the embodiment examples according to FIGS. 12 and 13. There, the links 39 and 40 have coupling elements 39', 39" and 40', 40", respectively, at both ends in the form of a circular ball cups and correspondingly fitting ball heads which can be snapped together for instance like a snap joint. The links 39, 40 are preferably made of a material which has the property of at least slight elasticity, which makes such a snap joint possible. In FIG. 12, each link has, in agreement with the preceding embodiment example, a ball cup 39' at one end and a ball head 39" at the other end. In FIG. 13 two kinds of links 401 and 402 are provided, the links 401 have ball cups 40" on both sides and the links 402 have post-like ball heads 40" on both sides.

In the embodiment example according to FIG. 14, pulling and pushing means 43 are again guided in a guide 41 with a guide canal 42. The flexible cable 23 is a steel cable on which bead-shaped, i.e. spherical links 44 are fastened, for instance by spraying on or forming on with free mutual spacing from each other. These links 44 serve both as guiding means, i.e. guides with a radial clearance in the guiding canal 42, and as tooth-like engagement elements which mesh with a correspondingly serrated drive pinion 45.

There is claimed:

1. Drive device for moving an end fitting of a passive safety belt along a predetermined motion track which has track sections extending at an angle to each other comprising a flexible pulling and pushing means coupled to the end fitting to be moved, and a drive for driving the flexible pulling and pushing means, the combination therewith of a guide extending along the motion track in which the pulling and pushing means are guided with radial play relative to the pushing and pulling means axis, said pushing and pulling means in said guide having links which can move relative to one another, and are arranged with axial spacing in a fixed relationship to one another, the links being sleeve-like in form and the sleeve-like links are loosely linked up on a flexible cable, and wherein each link has on opposite ends support elements with each support element disposed in engagement with a support element of an adjoining link in an articulated manner with a space between the link end faces of adjoining links to allow relative movement between the support elements on adjacent links when negotiating curves, at least one of the lined-up links having a protruding output post, the link having the output post is arranged between two equalization springs.

2. Drive device according to claim 1, wherein the links are resiliently braced against each other.

3. Drive device according to claim 1, wherein the support elements are the bearing elements of the links and have through holes for passage therethrough of the cable.

4. Drive device according to claim 3, wherein the through holes of the links are expanded at the opposite ends of the holes.

5. Drive device according to claim 3, wherein the bearing elements are in the form of ball cups and ball heads.

6. Drive device according to claim 1, wherein the pulling and pushing means is driven at the links by friction or positive engagement with the drive.

7. Drive device according to claim 6, wherein the links have a substantially smooth surface and are in frictional engagement with a motor drive.

8. Drive device according to claim 6, wherein the links have a substantially smooth surface and are in frictional engagement with a drive pulley and a resilient counter pulley.

9. Drive device according to claim 6, wherein the links have tooth-like engagement elements which are coupled with a drive pinion.

10. Drive device according to claim 9, wherein the links have a rectangular cross section and are provided in the manner of a rack with tooth-like cuts at least at one flank.

11. Drive device according to claim 9, wherein the links have a circular cross section and are provided with ring-like engagement elements.

12. Drive device according to claim 9, wherein the links themselves serve as engagement elements.

13. Drive device according to claim 1, wherein the output post is for the end fitting of a safety belt which extends beyond the guide for the pulling and pushing means.

14. Drive device according to claim 1, wherein the elongated guide which has curves, has a largely closed guidance canal for the pulling and pushing means, and a longitudinal slot for the output post.

15. Drive device according to claim 8 or claim 9, wherein the drive pinion or the drive pulley can be detached by being swung away from the pulling and pushing means.

16. Drive device according to claim 1, wherein an end fitting for the belt of the safety belt is fastened at the output post, the end fitting has a hook-like extension with which it is hooked when in the working or operating position, to an armature extension fixed to the housing.

* * * * *

UNITED STATES PATENT AND TRADEMARK OFFICE
CERTIFICATE OF CORRECTION

PATENT NO.   : 4,505,496
DATED        : March 19, 1985
INVENTOR(S)  : Artur Fohl It is certified that error appears in the above-identified patent and that said Letters Patent is hereby corrected as shown below:

Column 6, line 35, "linked" should be -- lined --.

Signed and Sealed this

Fifteenth Day of October 1985

[SEAL]

Attest:

Attesting Officer

DONALD J. QUIGG

Commissioner of Patents and Trademarks—Designate